// OR 3,891,299

United S
Rushing

[11] 3,891,299
[45] June 24, 1975

[54] BEARINGLESS OSCILLATING SCANNER
[75] Inventor: Frank C. Rushing, Columbia, Md.
[73] Assignee: Westinghouse Electric Corporation, Pittsburgh, Pa.
[22] Filed: Oct. 3, 1972
[21] Appl. No.: 294,731

[52] U.S. Cl. .................... 350/6; 178/7.6; 250/235; 350/285
[51] Int. Cl. ............................................. G02b 17/00
[58] Field of Search............ 178/7.6; 324/154 R, 97; 350/6, 7, 285; 250/235

[56] References Cited
UNITED STATES PATENTS
| | | | |
|---|---|---|---|
| 1,918,358 | 7/1933 | Walton | 324/97 |
| 2,982,915 | 5/1961 | Rich et al | 324/154 R |
| 3,161,826 | 12/1964 | Picard | 324/97 |
| 3,234,844 | 2/1966 | Fain et al | 250/235 |

*Primary Examiner*—Ronald L. Wibert
*Assistant Examiner*—Michael J. Tokar
*Attorney, Agent, or Firm*—D. F. Straitiff

[57] ABSTRACT

A bearingless scanner having a mirror supported for oscillations with simple harmonic motion at resonance by pairs of spiral springs arranged at opposite sides of the mirror. The springs of each pair are attached at points spaced 180° apart between the mirror structure and a foundation such that the force couples produced by each pair of springs are equal and opposite. A torsion spring supports the mirror structure along the axis of the oscillating motion. A drive system without bearings supplies torque in resonance with the harmonic motion and in a manner without producing residual forces on the structure for the scanner.

9 Claims, 4 Drawing Figures

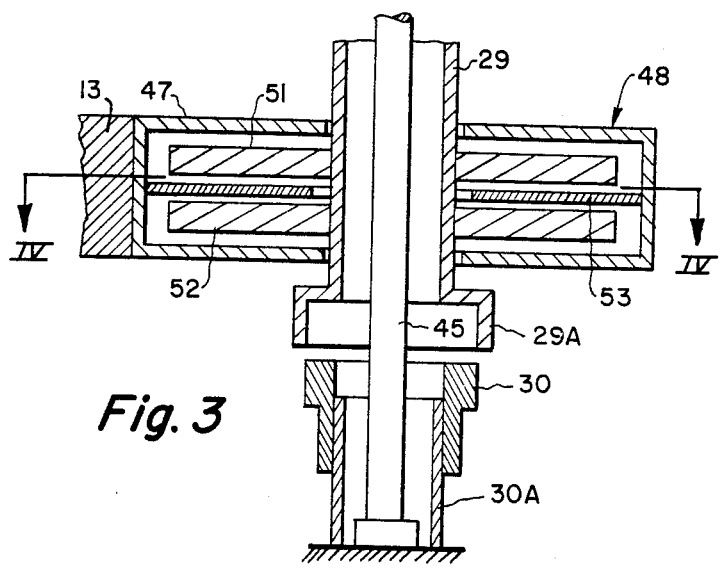
Fig. 3
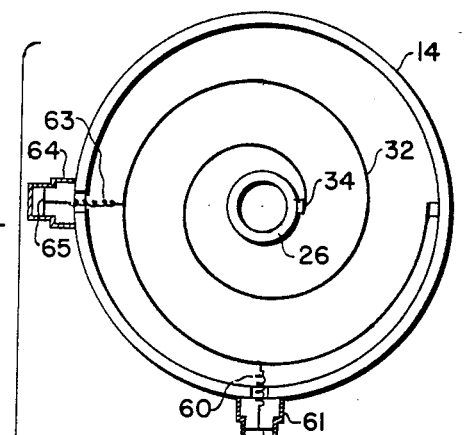
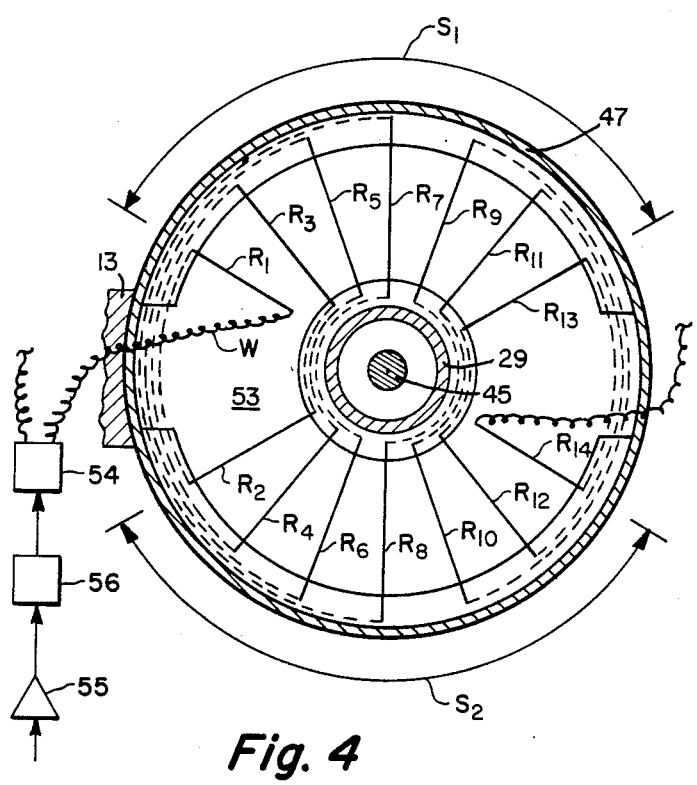
Fig. 4
Fig. 2
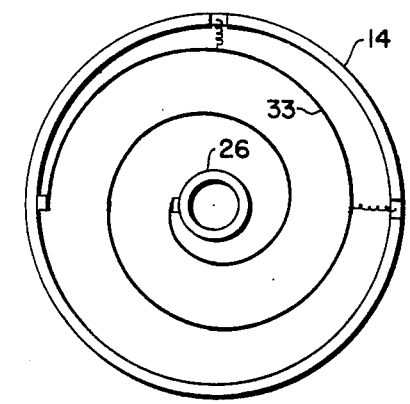
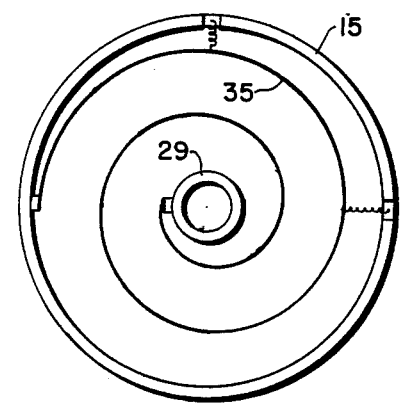
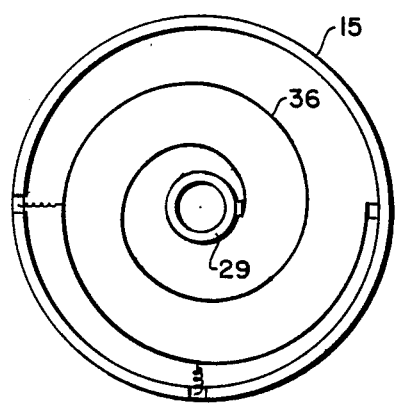

BEARINGLESS OSCILLATING SCANNER

BACKGROUND OF THE INVENTION

Various forms of sensing devices are known in the art for mapping a scene through the process of sensing sequenced lines across the scene to form a pictorial display. When it is desired to map a scene from an earth orbiting satellite, a tilted mirror has been supported and arranged for rotation at a constant angular velocity about an axis parallel to the direction of spacecraft travel. The mirror when scanning the earth from horizon-to-horizon, will reflect light rays of varying intensity from the scene into a sensor. On a second or subsequent sweep, the mirror will scan a different line because of the travel of the spacecraft. When such a mirror is rotated at a constant angular velocity to scan a scene, the viewing time for a given unit of area near the horizon is much less than for the same unit area at nadir. This results in poor resolution and a low quality reproduction of a scene when scanning from horizon-to-horizon.

An improved form of an oscillating scanner is disclosed in copending application Ser. No. 330,163, filed Feb. 6, 1973, in the names of Frank C. Rushing and Gordon S. Ley. The problems and underlying difficulties surrounding the employment of a continuously rotating mirror to map a scene are set forth in detail and are overcome to a large degree by the oscillating scanner system disclosed and claimed therein. The oscillating scanner system disclosed therein employs simple harmonic motion to oscillate a mirror about a center position arranged at nadir. This oscillating system has the advantage of producing equal exposure time per unit area of the scene being mapped as the mirror oscillates from horizon-to-horizon. The mirror, together with a support structure, formed a primary body which was coupled to a reaction body by a spring to provide the oscillatory motion through the use of inertia stored between the reacting body and the primary body. Both of the bodies were mounted by bearings on a common axis and drive means were provided to supply energy to the oscillating system due to losses as a result of friction and other inefficiencies in the mechanical system. This type of system as well as the older form of a continuously rotating mirror requires the use of bearings which are complicated to design for use in the environment of outer space particularly since maintenance or other forms of service to these bearings, as a practical matter, are impossible to perform. The primary object of the present invention is to provide an improved scanner system without employing bearings or the like to support the scanning mirror structure during its oscillations.

SUMMARY OF THE INVENTION

In accordance with the present invention, there is provided a bearingless scanner supported for oscillation by elastic members constructed and arranged with a spring constant to produce a desired natural frequency of oscillation. The invention contemplates a mirror reflecting angle, from a zero displacement position, about 10° and upwards to 1 radian or more. The invention provides an apparatus to accomplish oscillation magnitudes about a specified axis with a high degree of accuracy by providing a unique choice of dynamic spring characteristics and configurations for the oscillating scanner.

Specifically, the present invention provides a bearingless oscillating scanner having an optical reflecting system including a parabolic mirror for condensing light rays into a beam directed through a hollow sleeve to a detector. The sleeve supports the parabolic mirror at one end while at its opposite side, the mirror has a second supporting sleeve, the sleeves being arranged concentrically along a predetermined oscillation axis. A pair of spiral springs are fastened to each sleeve such that the point of attachment for the springs in each pair is diametrically opposed on the sleeves. The free ends of the springs are attached to a foundation supported frame. The mirror, together with the sleeves, form an assembly that is supported against the earth's gravity by a torsion bar arranged coaxially within the second sleeve. A bearingless and foundation supported drive means with a zero magnetic pull is arranged in a driving relationship with the free end of the second sleeve. In its preferred form, the drive means takes the form of two spaced-apart pole pieces. Each of the pole pieces is split and further characterized as permanent magnets so as to have opposed magnetic poles at their division line. Between the pole pieces, there is arranged a foundation mounted winding formed in a segmented manner so as to develop a torque with a zero magnetic pull at a large relative displacement between the pole pieces with respect to the winding.

These features and advantages of the present invention as well as others will be more fully understood when the following description is read in light of the accompanying drawings, in which:

FIG. 2 illustrates the phase relationship between the attachments for the spiral springs employed in the bearingless scanner of FIG. 1;

FIG. 3 is a sectional view in elevation taken along line III-III of FIG. 1 and illustrating the bearingless torquer; and FIG. 4 is a view taken along line IV-IV of FIG. 3 and illustrating the wire winding pattern for the stationary armature.

Figure 1:
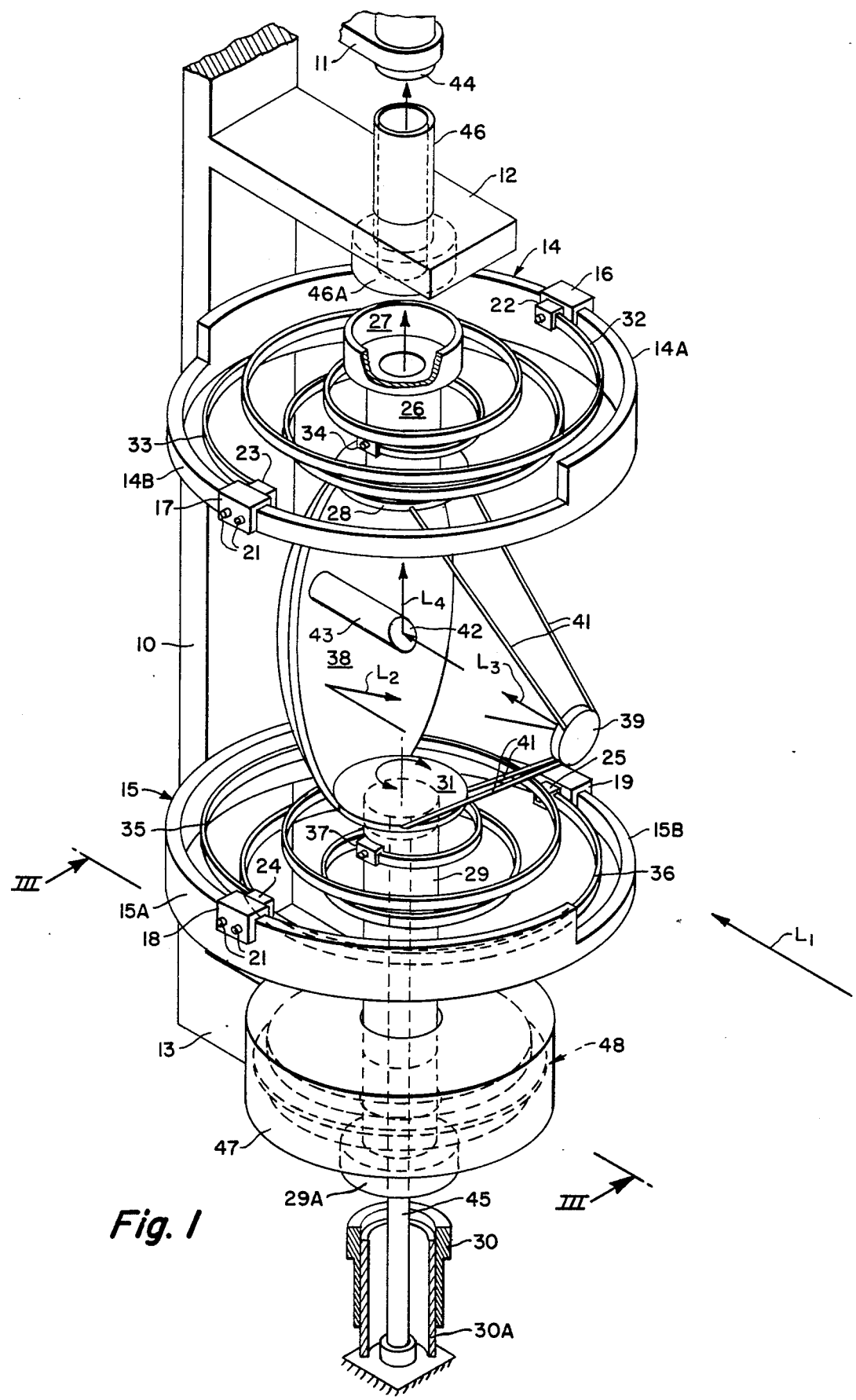
FIG. 1 is a perspective view of a bearingless oscillating scanner according to the present invention.

Referring now to FIG. 1, there is illustrated a vertically-arranged housing bracket 10 supported by a foundation, not shown, of a spacecraft or satellite. Upper support arms 11 and 12 extend in a horizontally spaced relation from the bracket 10. A lower support arm 13 extends horizontally from the lower end of the bracket 10. Between the arms 12 and 13, there is arranged upper and lower circular frames 14 and 15, respectively. These frames have a broad rim section 14A and 15A, respectively, which terminate into a narrow rim section 14B and 15B, respectively. As clearly shown in FIG. 1, the circular frames 14 and 15 are attached to the bracket 10 such that the broad rim sections 14A and 15A are arranged at opposite sides thereof. Rim section 14A carries a clamp block 16; rim section 14B carries a clamp block 17; rim section 15A carries a clamp block 18 and rim section 15B carries a clamp block 19. Each of the clamp blocks 16–19 is secured to their respective circular frames by screws 21. The clamp blocks 16–19 have spring clamps 22–25, respectively. Vertically arranged at the center of the circular frame 14 is a tubular shaft 26 having a flange 27 at its upper end and a disc 28 at its lower end. A tubular shaft 29 is centrally arranged within the lower circular frame 15 having a disc 31 attached to its upper end. A pair of upper spiral springs 32 and 33 is connected at their outer ends to the circular frame 14 in a spaced-apart relation by the spring clamps 22 and 23, respectively. Clamp blocks 34 secure the inner ends of springs 32 and 33 to the tubular shaft 26. A pair of lower spiral springs 35 and 36 is attached at their outer ends by the clamp blocks 24 and 25, respectively. Clamp blocks 37 secure the inner ends of the springs 35 and 36 to the lower shaft 29.

A parabolic mirror 38 rigidly interconnects the discs 28 and 31. A light ray traveling in the direction of the arrow L1 passes to the surface of the mirror 38 where it is reflected in the direction indicated by the arrow L2 toward a mirror 39 supported in a spaced relation from the mirror 38 by rods 41 connected at their ends to the discs 28 and 31. After the light ray is reflected by the mirror 39, it travels in the direction indicated by the arrow L3 toward a mirror surface 42 formed on a rod 43 attached to the parabolic mirror 38. The mirror surface 42 is disposed at an angle of 45° with respect to the direction of the received light ray so as to direct the light along a pathway in a direction represented by the arrow L4 vertically through the bore in the shaft 26 until it strikes the surface of a sensor 44 carried by the support arm 11. Those skilled in the art will appreciate that the sensor 44 may be designed to produce an electrical signal in response to changing energy levels of rays other than that of light rays, which were specifically referred to herein for descriptive purposes only.

It is important to note that the mirrors 38, 39 and 42 are supported and arranged in a fixed relationship with respect to each other whereby as the discs 28 and 31 oscillate about a vertical axis, the reflecting relationship of the mirrors remains constant. The mirrors 38, 39 and 42 along with the tubular shafts 26 and 29 define an assembly that is supported against the earth's gravitational force by a torsion bar 45 arranged vertically along the axis of the shaft 29 where it is rigidly attached to the disc 31. The torsion bar 45 is supported at its lower end by the foundation of the spacecraft.

The upper support arm 12 slideably carries a sleeve 46 having, at its lower end, an enlarged flange 46A arranged to be received within the flange 27. Power means, not shown, are employed to displace the sleeve 46 within flange 27. The shaft 29 has an enlarged flange 29A which slideably receives a collar 30. This collar slides along a foundation mounted shaft 30A by power means, not shown. When the flange 46A and collar 30 are displaced within the flange 27 and 29A, respectively, a stabilizing support is provided to hold the mirror assembly during periods when the scanner is not in use such as during the launching of the scanner into an earth orbit. During launching, vibrations and forces are developed that may damage the scanning structure including the mirrors.

Driving means are employed to supply torque to initiate and maintain oscillation of the scanning mirrors. Since the oscillations of the mirror are intended to operate at resonant frequency, only energy losses due to dampening and inefficiencies of the springs are supplied by the drive system during actual operation. According to the features of the present invention, there is provided a unique form of torque producing drive base on the D'Arsonval principle. As FIG. 1 illustrates, the lower support arm 13 is connected to a frame 47 of the drive means 48.

FIGS. 3 and 4 illustrate in greater detail the construction of the drive means 48. Rigidly attached to the lower shaft 29 are spaced-apart permanent magnet pole pieces 51 and 52 which produce a flux therebetween in a direction parallel to the axis of the torsion bar 45. A disc-like armature 53 is attached to the frame 47. The armature includes a grouped winding arrangement of wires best illustrated in FIG. 4. The winding is formed by a continuous wire arranged symmetrically with respect to a horizontal division line forming sectors S1 and S2. The useful flux developed by the winding occurs when the wire is arranged in a radial direction. As illustrated in FIG. 4, from the terminal end of a wire W there is formed a radial segment R1 extending to the rim of the disc 53 where the wire passes along the periphery of the disc to the lower sector S2 and forms a radial segment R2 toward the hub. At the hub, the wires continues along the peripheral surface of the shaft 29 to a point where it forms radial segment R3. From R3, the wire extends along the outer peripheral surface to the lower sector and forms radial segment R4 in a direction toward the hub. The windings continue in this manner forming segments R5, R6 and R7 to occupy one-half of the sectors S1 and S2. From R7, the wire extends along the outer peripheral surface to sector S2 and forms radial segment R8 from where the wire is laid in a similar manner at the opposed peripheral surface of shaft 29 and the disc 53 to form radial segments R9–R14. Since the winding is supported on a stationary body, the lead wires from R1 and R14 connect directly to a junction terminal of a power supply 54 without the need for slip rings or the like. In actual practice, several hundred radial segments are formed. An oscillation amplitude control system is employed to energize the drive means just described. This system may incorporate an encoder wheel assembly or a second winding of wires in the disc 53 to produce a signal from an amplifier 55 proportional to the actual oscillation amplitude of the mirror 38. The amplifier 55 is connected to oscillation controller 56 which generates an output signal connected to the power supply 54 for controlling the drive means 48 so as to produce a torque in a phased relation with the velocity of the mirror. It is preferred to provide a substantial radial clearance between the shaft 29 and the disc 53, also between the pole pieces 51 and 52 and the housing 47 to allow relative lateral movement between these members. This form of drive means has the feature of eliminating both a lateral force component and an axial magnetic pull on the body while developing the desired torque.

An important aspect of the present invention relates to the relative disposition of the spiral springs with respect to each other for the purpose of canceling traverse forces and couples on the mirrors and their support structure. FIG. 2 illustrates schematically the arrangement of the spiral springs with respect to their attachments between the shafts 26 and 29 and the frame 14 and 15. As FIG. 2 illustrates, each of the springs 32, 33, 35, 36 is wound in the same direction. The springs 32 and 33 are attached to the shaft 26 at points spaced 180° apart. At their outer ends, the springs are attached to the frame 14 at points also spaced 180° apart. As a result, all the mass effects and the transfer spring forces are in opposite directions with respect to the springs 32 and 33. The springs 35 and 36 are arranged and attached in the same manner as described with respect to springs 32 and 33. Since the springs are all spaced along the shafts, the mass and spring forces produce couples on the shafts 26 and 29. The couple produced by the springs 32 and 33 is equal and opposite to the couple produced by the springs 35 and 36. Thus, the transverse effect is canceled out.

For the purpose of further describing the present invention, reference will be made to a "driven structure" which is intended to include as illustrated in FIG. 1, all elements supported by the springs 32, 33, 35 and 36 and the torsion bar 45, e.g., mirrors 38, 39, 42 and shafts 26 and 29. To maintain the oscillation of this driven structure in an accurate manner about a specified vertical axis, the transverse forces on the structure must add up or cancel out to a zero net force within small allowable tolerances. This condition is achieved by several procedures. First, dynamic balancing of the mirror structure should be carried out in a precise manner. Second, the springs 32, 33, 35 and 36 must be disposed about and along the desired oscillation axis to produce a continuous cancellation of resulting forces and moments acting on the driven structure. Thirdly, the mirror structure should be formed as a unique combination of relative mass and inertia about the principal axis to minimize the effects of any residual transverse forces on the mirror structure. Dynamic balancing should be performed before assembly with the springs using a conventional precision balancing machine. The mass balance and the spring force relationships do not have to be perfect on an initial assembly of the scanner. The final precision balancing can be done after final assembly when the driven structure can be oscillated and the deviation from the axis of oscillation from the desired line can be measured and then a procedure along the lines of conventional dynamic balancing of a rotor and the final assembly can be followed for the mass balanced condition. Weight can be added or subtracted from the driven structure to correct for residual mass unbalances. To correct for spring force or couple unbalance, the spring clamps 22–25 are made adjustable relative to the circular frames 14 and 15.

Those skilled in the art will appreciate that the design of the dynamic system can be carried out with the objective to minimize the effects of any remaining unbalance. The dynamic system shown has three natural frequencies, one of which is the desired frequency of oscillation about the vertical axis and the other two frequencies are combinations of transverse motions of the center of gravity and the angular motion about the axis through the center of gravity. By designing the latter two natural frequencies in a manner that is low when compared with the oscillating frequency, there is a tendency to isolate the bodies from disrupting residual mass and spring force unbalance very much in the manner of conventional vibration isolators. This combination is achieved by the proper combination of transverse and angular spring constants with the driven structure and inertia about an axis through the center of gravity. In the embodiment illustrated in the drawings of the present invention, it has resulted in an elongated system along the oscillation axis.

Since natural dampening of the transverse and angular oscillation during operation is very low and dampening is desirable, dampening devices can be selected to dampen the undesirable motion while not dampening the desired oscillation of the driven structure. Such a dampener can be applied by attaching a tuned dampener at a selected location to one or more of the spiral springs where it is sensitive to the undesired motion. One form of such a dampener is illustrated in FIG. 2 in combination with the spring 32. The dampener takes the form of a coil spring 60 attached to the spring 32 at a point near to the attachment point to the frame 14. The frame 14 has an opening provided for the spring to pass through to the outer surface of the rim where there is supported a dashpot cylinder 61 having a piston 62 connected to the free end of the spring 60. A second dampener system incorporates a spring 63 attached to the spring 32 at a position 90° from the point of attachment of spring 60. The frame 14 has an opening for the spring 63 to pass to the outer surface of the rim where there is mounted a dashpot cylinder 64 having a piston 65 connected to the free end of the spring 63. The natural oscillation frequency of the springs 60 and 63 is selected low when compared with the desired oscillation motion of the driven structure and the range of the undesired frequency. By arranging the springs 60 and 63 at intervals of 90° they will sense components of any undesired motion and dampen it out. This will selectively dampen the lower frequencies while removing only a negligible amount of energy from the desired motion. For example, if the desired frequency is selected at 6–10 cycles per second, then the natural frequency of both spring-dashpot combinations should be selected at 2 cycles per second. An alternative approach is to make the transverse and angular natural frequencies high when compared with the operating frequency of the oscillator. This results in a system that will not magnify the effects of a residual unbalancing force and the stiffer system will tend to move sideways only as much as static deflection would be under the effects of a small residual unbalance. In view of the foregoing description of the preferred embodiment and the discussion of its underlying theory, those skilled in the art will appreciate that there are numerous other arrangements and types of springs including torsion bars which may be employed for a bearingless scanner to operate in a precise and accurate manner about a selected axis.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A bearingless oscillating scanner of the type for scanning a scene, comprising:

a stationary sensor for producing a signal in response to energy rays having varying energy levels, multiple mirror means positioned for receiving said rays from a scene and directing such rays to a pathway leading to said sensor, a mirror support structure carrying said multiple mirror means and arranged for oscillation about a predetermined axis aligned with said pathway, a stationary member, a plurality of spring means arranged at axially-spaced-apart locations along said predetermined axis, each of said spring means being interconnected between said stationary member and said mirror support structure in a manner to provide an elastic restoring force to said mirror support structure when displaced during oscillation, and drive means for delivering oscillation-sustaining torque forces intermittently to said mirror support structure.

2. An apparatus according to claim 1 wherein said spring means further comprises two pairs of spiral-formed springs centered on said axis, and means for securing opposite ends of each spring at diametrically-opposed points to said stationary member and to said mirror support structure, respectively.

3. An apparatus according to claim 2 wherein said mirror support structure further comprises tubular shafts projecting in opposite directions therefrom, respectively, and aligned with said predetermined axis, one of such tubular members encircling said pathway, and a torsion bar aligned with said axis, having one end attached to said mirror support structure and extending through the other one of said tubular shafts to a stationary end.

4. An apparatus according to claim 3 wherein said pairs of springs are attached to said mirror support structure via said shafts in a manner to produce equal and opposite force couples along said axis.

5. An apparatus according to claim 1 wherein said drive means comprises permanent-magnet pole pieces spaced-apart along said axis and secured to said mirror support structure, and a stationary controlled-flux-producing armature disposed between said pole pieces for effecting oscillatory rotary movement of said pole pieces about said axis.

6. An apparatus according to claim 5 wherein said drive means further comprises control means for energizing said controlled flux-producing armature in a phased relation with the oscillation of said reflecting means.

7. An apparatus according to claim 1, further comprising means carried by said stationary member for exerting a dampening force upon at least one of said spring means to dampen any undesired vibrations thereof.

8. An apparatus according to claim 7, wherein said dampening means comprises a dashpot supported by said stationary member, and resilient means interconnecting said dashpot and one of said spring means.

9. An apparatus according to claim 1 wherein said multiple mirror means comprise:

a parabolic mirror facing radially inward toward said axis, a first small mirror facing said parabolic mirror, rods extending from said support structure for supporting said first small mirror in central alignment with said parabolic mirror, and a small tilted mirror disposed between said parabolic mirror and said first small mirror for directing energy rays from said first small mirror along said pathway.

* * * * *